United States Patent
Ritter et al.

(10) Patent No.: US 8,476,177 B2
(45) Date of Patent: Jul. 2, 2013

(54) HIGHLY REFRACTIVE AND HIGHLY TRANSPARENT OPTICAL GLASS

(75) Inventors: Simone Ritter, Mainz (DE); Ute Woelfel, Mainz-Laubenheim (DE); Stefanie Hansen, Gensingen (DE)

(73) Assignee: Schott AG, Mainz (DE)

( * ) Notice: Subject to any disclaimer, the term of this patent is extended or adjusted under 35 U.S.C. 154(b) by 313 days.

(21) Appl. No.: 12/958,540

(22) Filed: Dec. 2, 2010

(65) Prior Publication Data

US 2011/0136652 A1   Jun. 9, 2011

(30) Foreign Application Priority Data

Dec. 4, 2009 (DE) .......................... 10 2009 047 511

(51) Int. Cl.
*C03C 3/155* (2006.01)
*C03C 3/15* (2006.01)
*C03C 3/068* (2006.01)

(52) U.S. Cl.
USPC ............................... 501/51; 501/50; 501/78

(58) Field of Classification Search
USPC .............................................. 501/50, 51, 78
See application file for complete search history.

(56) References Cited

U.S. PATENT DOCUMENTS

| 2,150,694 | A | | 3/1939 | Morey |
| 4,120,732 | A | * | 10/1978 | Komorita et al. ............... 501/42 |
| 4,268,312 | A | | 5/1981 | Ishibashi et al. |
| 2006/0128550 | A1 | | 6/2006 | Leister |
| 2010/0018252 | A1 | | 1/2010 | Zou et al. |

FOREIGN PATENT DOCUMENTS

| DE | 691 356 | 5/1940 |
| DE | 29 42 038 | 5/1980 |
| DE | 102 57 049 | 6/2004 |
| JP | 53-4023 | 1/1978 |
| JP | 2006-1286 | 1/2006 |
| JP | 2007-269613 | 10/2007 |
| JP | 2007-290899 | 11/2007 |
| WO | 2008/050591 | 5/2008 |

* cited by examiner

*Primary Examiner* — Karl Group
*Assistant Examiner* — Elizabeth A Bolden
(74) *Attorney, Agent, or Firm* — Michael J. Striker

(57) ABSTRACT

The optical glass has a refractive index $n_d$ of $1.945 \leq n_d \leq 1.97$, an Abbe number $v_d$ of $33 \leq v_d \leq 36$, and a composition with the following components in amounts expressed in % of their cations, with respect to the total number of cations in the composition: $B^{3+}$, 35-46; $La^{3+}$, 25-35; $Ta^{5+}$, 6-14; $W^{6+}$, 6-13; $Zr^{4+}$, 1-7; $Gd^{3+}$, 0-5; $Nb^{5+}$, 0-4; $Y^{+3}$, 0-4; $Ba^{2+}$, 0-2; $\Sigma$ alkaline earth metal cations, 0-2, $\Sigma$ $La^{3+}+Ta^{3+}+W^{6+}+Zr^{4+}+Gd^{3+}+Nb^{5+}+Y^{3+} \geq 50$; and at least one fining agent, 0-0.3. Also a ratio of $B^{3+}$ to $La^{+3}$ is 1.1 to 1.6 and a ratio of $B^{3+}$ to $\Sigma$ $Si^{+4}+B^{3+}$ is $\geq 0.5$. The glass is free of lead, arsenic, $Ti^{4+}$, $Th^{4+}$, $Zn^{2+}$, $F^-$, and $Hf^{+4}$.

8 Claims, 2 Drawing Sheets

HIGHLY REFRACTIVE AND HIGHLY TRANSPARENT OPTICAL GLASS

CROSS-REFERENCE

The invention described and claimed herein below is also described in German Patent Application 10 2009 047 511.7, filed on Dec. 4, 2009, in Germany. The aforesaid German Patent Application, whose subject matter is incorporated herein by reference thereto, provides the basis for a claim of priority of invention for the invention claimed herein below under 35 U.S.C. 119 (a)-(d).

BACKGROUND OF THE INVENTION

1. The Field of the Invention

The present invention relates to a highly refractive and highly transparent optical glass, the uses of such a glass, optical elements and methods of production of the glass and the optical elements, respectively.

2. The Description of the Related Art

In recent years there has been an enhanced trend to minaturize in optical and opto-electronic technologies, especially for applications in the fields of imaging, projection, telecommunication, optical communications engineering, mobile drive and laser technology. This tendency can be seen from the final products, which have become smaller and smaller, which of course requires increasing miniaturization of the individual elements and components of such final products. Therefore, there is a demand for glasses with increasing refractive indices, i.e. glasses having a higher refractive index. In addition, these highly refractive glasses should also have a low dispersion, i.e. high Abbe numbers. High Abbe numbers facilitate the correction of the chromatic error in a lens system (chromatic aberration).

Normally glasses with high refractive indices have low Abbe numbers, i.e. they have high dispersion. In addition, for increasing quality requirements very high internal transmittances of the material are necessary. Highly refractive glasses often contain lead, bismuth or titanium oxides, which have negative influence on the internal transmittance, in particular in the UV range.

Indeed prior art glasses with similar optical properties or chemical composition have already been described, but these glasses have considerable disadvantages. In particular, many of the glasses contain large amounts of $SiO_2$, which as a network former increases the transformation temperature of the glass, which causes a longer viscosity behavior and reduces the refractive index. Besides $SiO_2$ also components, such as $B_2O_3$, alkali metal oxides and/or F, are contained in many glasses, which, in addition reducing the refractive index, also easily evaporate during the melting and the burning process, which requires a complicated exact adjustment of the glass composition.

In the prior art greater amounts of titanium dioxide (more than 4% by weight) are often used, which however undesirably increases the tendency to crystallize, reduces the Abbe number, and also shifts the UV transmission cut-off in the direction of longer wavelengths.

In highly refractive glasses, inter alia, radioactive components that are hazardous to health, such as $ThO_2$, may also be present in the glass composition.

DE 0 691 356 describes a method for the production of optical glasses with high refractive indices of 1.71 to 2.01 as well as Abbe numbers of 19 to 54. However the combination of a high refractive index of >1.945 and an Abbe number of $\geq 33$ is not attained by these glass systems. In addition, the glasses contain $TiO_2$ or $ThO_2$. In the glasses according to the present invention both components are not contained due to the above-mentioned reasons.

JP 200601286 describes an optical glass suitable for smooth precise pressing. This optical glass contains required amounts of ZnO and $Li_2O$, which are not contained in the glass according to the present invention to facilitate the particular combination of refractive index and Abbe number. The glasses disclosed in JP 200601286 only have a maximum refractive index of 1.90.

JP 2007269613 also discloses an optical glass for processing by smooth precise pressing. These glasses necessarily contain 5 to 42 mol % of ZnO. ZnO favorably influences viscosity in order to provide acceptable viscosity behavior for processing of the glass which is described here. However ZnO also reduces the refractive index. The desired refractive index and combination of refractive index and Abbe number cannot be achieved with the minimum amount of ZnO of 5 mol % that is incorporated in these prior art glasses.

JP 534023 describes a hafnium-containing optical glass having a refractive index of 1.7 to 2.0 and an Abbe number of 25 to 55. The glass according to the present invention does not contain hafnium oxide, because it requires very high melting temperatures and thus it is not advantageous for the production method. It can often result in batch relicts, i.e. insoluble raw materials.

WO 2008/050591 also describes an optical glass having very high refractive indices of 1.78 to 2.2 and an Abbe number of 16 to <40, which is suitable for smooth precise pressing. $TiO_2$ and $Nb_2O_5$ as well as ZnO are required ingredients of this optical glass. Due to the above-mentioned reasons ZnO is omitted from the glass according to the present invention. Also the sum total amount of $TiO_2$ and $Nb_2O_5$ in the glass according to the present invention should not be greater than 2 mol %. Both components are disadvantageous for a high internal transmittance, in particular at the UV transmission cut-off.

JP 2007290899 describes a glass composition which necessarily contains fluorine in all of its embodiments and is suitable for radioprotection. But fluorine is a highly volatile component, which easily causes inhomogeneities when the glass is melted. In addition, it strongly reduces the refractive index. Therefore, fluorine is not contained in the glass according to the present invention.

The production of the highly refractive glasses is difficult, because they attack refractory material very strongly. This is caused, inter alia, by the amounts of $B_2O_3$ contained in the glass. This results in a considerable deterioration of the properties and the homogeneity. Thus for example disintegration of a crucible of silica glass causes streaks of $SiO_2$, reduction of the refractive index due to $SiO_2$ from a quartz crucible, or in the case of an attack of a crucible of platinum dissolved ions of platinum or metallic particles of platinum. Platinum ions absorb in the UV range and result in a decrease of the transmittance of the glasses in the UV range, i.e. the UV transmission cut-off is shifted in the direction of longer wavelengths. On the other hand, the particles of platinum result in scattering and thus in a decrease of the transmittance range over the whole range of wavelengths.

This attack on the refractory material has the result that these optical glasses, which are melted according to conventional melting processes, no longer fulfill the enhanced technical specifications with respect to transmittance and homogeneity for some applications.

In addition, it is desired that besides the above-mentioned and the required optical properties the glasses are sufficiently chemically resistant and have coefficients of expansion which are as low as possible.

SUMMARY OF THE INVENTION

It is the object of the present invention to provide an optical glass which has the desired advantageous optical properties ($n_d/v_d$ & $\tau_i$). Furthermore these glasses should be suitable for use in various applications in the areas of imaging, projection, telecommunication, optical communications engineering, mobile drive and laser technology. It should also be possible to easily melt and process them, and they should have sufficient crystallization stability which facilitates a production in continuously used aggregates. Also, the optical glass should couple with an electromagnetic alternating field, in particular a field of high frequency (abbreviated as HF), so that it is possible to introduce large amounts of energy into a melt by induction. A prerequisite for that is a good specific electrical conductivity of the glass over a temperature range in which optimum melting occurs.

The direct inductive heating of the melt by a high frequency electromagnetic filed facilitates the production of particularly pure materials, because no direct contact between the melt and the material of a heating apparatus takes place.

The above-stated objects are attained by the embodiments of the present invention described in the patent claims.

In this description and in the patent claims the terms "free of X" and "free of a component X", respectively, mean that this component has not intentionally been added to the glass for a special purpose, but may only be present as an impurity in another component of the glass. Thus this component X has not been added to the glass as a single component.

The information given about the amounts of the respective components in the glass composition is given as % of the corresponding cations, with reference to the total number of all cations in the composition. The corresponding anions in the respective components are oxygen anions.

The basic system of the glass according to the present invention is the lanthanum-tungsten-tantalum-boron system, which provides a good basis for the intended properties.

In particular, the optical glass according to the invention has a refractive index $n_d$ of $1.945 \leq n_d \leq 1.97$, an Abbe number $v_d$ of $33 \leq v_d \leq 36$, and a composition comprising respective components in the following amounts, expressed in % of corresponding cations of the respective components in the composition, with reference to a total number or sum of cations in the composition:

| | |
|---|---|
| $B^{3+}$ | 35-46 |
| $La^{3+}$ | 25-35 |
| $Ta^{5+}$ | 6-14 |
| $W^{6+}$ | 6-13 |
| $Zr^{4+}$ | 1-7 |
| $Gd^{3+}$ | 0-5 |
| $Nb^{5+}$ | 0-4 |
| $Y^{3+}$ | 0-4 |
| $Ba^{2+}$ | 0-2 |
| Σalkaline earth metal cations | 0-2 |
| $\Sigma La^{3+} + Ta^{5+} + W^{6+} + Zr^{4+} + Gd^{3+} + Nb^{5+} + Y^{3+}$ | $\geq 50$ |
| cations of at least one fining agent | 0-0.3, | wherein a ratio of $B^{3+}$ to $La^{3+}$ is 1.1 to 1.6.

In this case the glass is free of $Ti^{4+}$, $Th^{4+}$, $Zn^{2+}$, $F^-$ and $Hf^{4+}$. Preferably the glass according to the invention is also free of lead, arsenic, alkali metals, alkaline earth metals and bismuth. Preferably the glass is also free of $Tl^+$, $Te^{4+}$ and $Be^{2+}$.

The glass according to the present invention is free of $Ti^{4+}$. This component negatively influences the transmittance of the glass by absorption in the UV range. In addition, it can act as a nucleating agent and thus can promote devitrification.

The glass is free of alkali metal oxides according to a particularly preferred embodiment. Alkali metal cations lower the refractive index of the glass too much. In addition, they tend to evaporate in the melt and cause inhomogeneity. Furthermore, cations having a small molar mass increase the risk of melting instabilities during production of the glass according to the present invention, as is described below for $Si^{4+}$.

The sum of alkaline earth metal cations in the glass according to the present invention is 0 to 1% of a total number of the cations in the glass. Preferably at most 0.8% of cations and more preferably at most 0.5% of cations are contained. The sum of the alkaline earth metal cations is at most 1% of the cations, which value should not be exceeded, since otherwise the refractive index of this glass system decreases too much. The addition of alkaline earth metal oxides can be used for optimization of the devitrification behavior of the glass. The glass is free of alkaline earth metal oxides according to a particularly preferred embodiment. Alkaline earth metal oxides cause the viscosity curve of the glass to be too steep, which has an unfavorable influence on the hot processing process.

Attributable to the production, the glass may contain $Si^{4+}$ in amounts of up to 2% of cations. More suitable are glasses which contain at most up to 1.5% of cations of $Si^{4+}$, preferable at most 1% of cations. Preferably the glass is free of $Si^{4+}$. On the one hand, $Si^{4+}$ may stabilize the glass with respect to its tendency to devitrification, but it is disadvantageous for this glass system for the preferred production process by a HF electromagnetic field. The glass according to the present invention substantially consists of (>86%) components having a high molar mass. However, $Si^{4+}$ and $B^{3+}$ have a low molar mass, which has an influence on the stability of the refractive index and the Abbe number of the glass according to the present invention over the time period during the production of the melt and may result in fluctuations. While $B^{3+}$ is indispensable for a good meltability, $Si^{4+}$ may be omitted, and thus the stability of the production process can be ensured.

The ratio of the amounts of substances of $B^{3+}$ to the sum of $Si^{4+}$ and $B^{3+}$ should be greater than 0.5. This ratio is particularly important for glasses which contain low amounts of alkali, or are free of alkali, to ensure their ability to couple with high frequency.

The coupling of the melt with an electromagnetic alternating field, particularly in the form of a high frequency field, means that the energy transferred to the melt by inductive coupling is higher than the energy which is lost from the melt by heat dissipation. Only in this way is it possible to increase of the temperature or maintain the melt by heating with a HF field.

The viscosity-temperature profile and the processing temperature of the glasses according to the present invention have been adjusted such that an optimal hot-pressing is possible.

In addition, the combination of crystallization stability and a suitable viscosity-temperature profile of the glass according to the present invention facilitates an almost problem-free further thermal processing treatments (pressing and/or further pressing).

In particular, the glasses according to the present invention have a refractive index $n_d$ of 1.945 to 1.970, preferably of 1.946 to 1.960, particularly preferably of 1.947 to 1.955. Preferably, the glasses have dispersion properties, which are characterized by an Abbe number $v_d$ of 33 to 36, preferably of 33.1 to 35, preferably of 33.2 to 35.

According to one embodiment of the present invention the glasses according to the present invention have a transformation temperature Tg of less than or equal to 700° C., further preferably of less than or equal to 690° C.

The glass according to the present invention has a proportion of $La^{3+}$ of at least 25% of cations, preferably of at least 26% of cations, more preferably of at least 27% of cations, and particularly preferably of 28% of cations. If the amounts of $La^{3+}$ are smaller than this lower limit, the high refractive index in combination with the high Abbe number cannot be attained. The amount of $La^{3+}$ is limited to at most 35% of cations, preferably 34% of cations, more preferably to 33% of cations, and particularly preferably 32% of cations. This upper limit should not be exceeded, because otherwise the viscosity of the glass increases too much and in addition the tendency to devitrification increases.

$W^{6+}$ also contributes to a high refractive index with a minimum proportion of 6% of cations, preferably 7% of cations, more preferably 8% of cations. Since however $W^{6+}$ can negatively influence the internal transmittance, the proportion of $W^{6+}$ is limited to at most 13% of cations, preferably at most 12% of cations, and more preferably at most 11% of cations.

The glass according to the present invention has an amount of $Ta^{5+}$ of at least 6% of cations, preferably at least 7% of cations, particularly preferably at least 8% of cations. The maximum proportion of $Ta^{5+}$ is 14% of cations, preferably at most 13% of cations, and further preferably at most 12% of cations. The amount of $Ta^{5+}$ in the glass should not be less than this lower limit in order to guarantee the high refractive index and to provide a stability of the glass with respect to devitrification. In addition, $Ta^{5+}$ within the given limits guarantees that the glass according to the present invention has the desired combination of high refractive index and high Abbe number.

$B^{3+}$ can be used as a network former and therefore must be contained in an amount of at least 35% of cations, preferably at least 36% of cations, and further preferably at least 37% of cations. However, the maximum proportion is already achieved with 46% of cations, preferably with 45% of cations, and more preferably 44% of cations. When this upper limit is exceeded, then a high refractive index according to the present invention is no longer possible.

However, amounts of $B_2O_3$ that are less than the above-mentioned lower limit should not be used, because the strongly network-forming properties of $B^{3+}$ increase the stability of the glasses with respect to crystallization and the chemical resistance. Furthermore the glasses are satisfactorily melted when $B^{3+}$ is included.

$Gd^{3+}$ acts like $La^{3+}$ with respect to the optical properties of the glasses. Therefore, it can be contained in the glass in a maximum amount of up to 5% of cations, preferably up to 4% of cations, more preferably up to 3.5% of cations. This upper limit should not be exceeded, because $Gd^{3+}$, a rare-earth oxide with a weak absorption band at about 590 nm, may cause a deterioration of the internal transmittance.

The glasses according to the present invention contain $Zr^{4+}$ in an amount of at least 1% of cations, preferably at least 2% of cations, and up to at most 7% of cations, preferably at most 6% of cations, and more preferably at most 5% of cations.

The glasses according to the present invention contain $Nb^{5+}$ in an amount of at least 0% of cations, preferably at least 0.1% of cations, more preferably 0.5% of cations, and at most 4% of cations, preferably at most 3% of cations, more preferably at most 2% of cations. $Nb^{5+}$ promotes a high refractive index, but also results in a lower Abbe number. Furthermore glasses which contain too much $Nb^{5+}$ have poor internal transmittances. Therefore the glass should not contain more than 2% of cations of $Nb^{5+}$.

The glass according to the present invention may contain an amount of $Y^{3+}$ of at most 4% of cations, preferably at most 3% of cations, and preferably at most 2.5% of cations. $Y^{3+}$ supports the desired combination of high refractive index and high Abbe number.

Preferably a sum total of the cations $La^{3+}$, $Ta^{5+}$, $W^{6+}$, $Zr^{4+}$, $Gd^{3+}$, $Nb^{5+}$ and $Y^{3+}$ is higher than or equal to 50% of cations, particularly preferably higher than or equal to 52% of cations, more preferably higher than or equal to 53% of cations, and particularly preferably higher than or equal to 54% of cations. With this sum the high refractive index in combination with the high Abbe number of the glass according to the present invention is guaranteed.

The glass according to the present invention as an optical glass is preferably also free of coloring and/or optically active, such as laser-active, components.

In particular, the glass according to the present invention is preferably also free of components, which are sensitive to redox reactions, for example silver or bismuth. At the melting temperatures components, which are "sensitive to redox reactions" easily change valence states in the melt, so that undesired discolorations may occur. In this way $Ag^+$ may easily be reduced to elemental silver, which besides yellowing, i.e. a shift of the UV absorption cut-off in the direction of longer wavelengths, may also result in scattering.

According to an embodiment of the present invention the glass according to the present invention is preferably also free of other components, which are not mentioned in the patent claims, i.e. according to such an embodiment the glass substantially consists of the above-mentioned components. In this case the term "substantially consisting of" means that other components may only be present as impurities, but are not deliberately added to the glass composition as a component of the glass.

The glass according to the present invention may contain fining agents in low amounts. Preferably, the sum of the cations in the fining agents added is at most 0.3% of the total number of cations in the composition, more preferably at most 0.2% of the cations, particularly preferably 0.1% of the cations. As a fining agent in the glass according to the present invention at least one of the following components may be contained in an amount expressed in % of the cations in the at least one component, with reference to the total number of cations in the composition:

| | | |
|---|---|---|
| $Sb_2O_3$ | 0-0.3 | and/or |
| SnO | 0-0.3 | and/or |
| $SO_4^{2-}$ | 0-0.3 | and/or |
| $F^-$ | 0-0.3. | |

The glass according to the present invention contains platinum as platinum ions or particles of platinum in a content of lower than 6 ppm, preferably lower than 5 ppm. Thus it is guaranteed that its UV absorption does not take place and that the glass achieves a high internal transmittance at 410 nm and at a layer thickness of 10 mm of greater than or equal to 80%.

The coefficients of expansion of the glasses according to the present invention are preferably in a range of lower than $9 \times 10^{-6}$ per K, as measured in the temperature range of 20 to 300° C. The internal transmittance of the glass at 410 nm and at a thickness of 10 mm is greater than or equal to 80%.

Furthermore the present invention relates to the use of the glasses according to the present invention for applications in the fields of imaging, projection, telecommunication, optical communications engineering, mobile drive and laser technology.

Furthermore the present invention also includes optical elements comprising the glass according to the present invention. In this case, in particular the optical elements may be lenses, aspheres, prisms and compact components.

The present invention also relates to a method for the production of glasses according to the present invention comprising the step of direct inductive heating of the above-described glass composition with an electromagnetic alternating field, particularly a HF field.

Furthermore the method of producing the glass of the invention preferably comprises the following step:
 a) incorporating shards or mixtures of the above-described compositions into a skull crucible.

Preferably the crucible is made of aluminium. A skull crucible facilitates melting to form a melt in contact with its own material, so that a particularly pure glass can be obtained. The mixture can be melted discontinuously and also continuously in an aggregate state.

Furthermore, the method preferably further comprises the following steps:
 b) liquefying a part of the mixture or the glass shards by means of a burner,
 c) coupling of a HF field of electromagnetic radiation with the pre-melted molten material so that the remaining mixture or the shards are melted by the provision of heat in the melt.

Thereafter the continuous or discontinuous elaboration of the glass is conducted.

The processing can either be conducted in a conventional way (in platinum) or in the case of particularly aggressive glasses in a second HF unit which is used for fining. The method used is described in DE 10 257 049.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
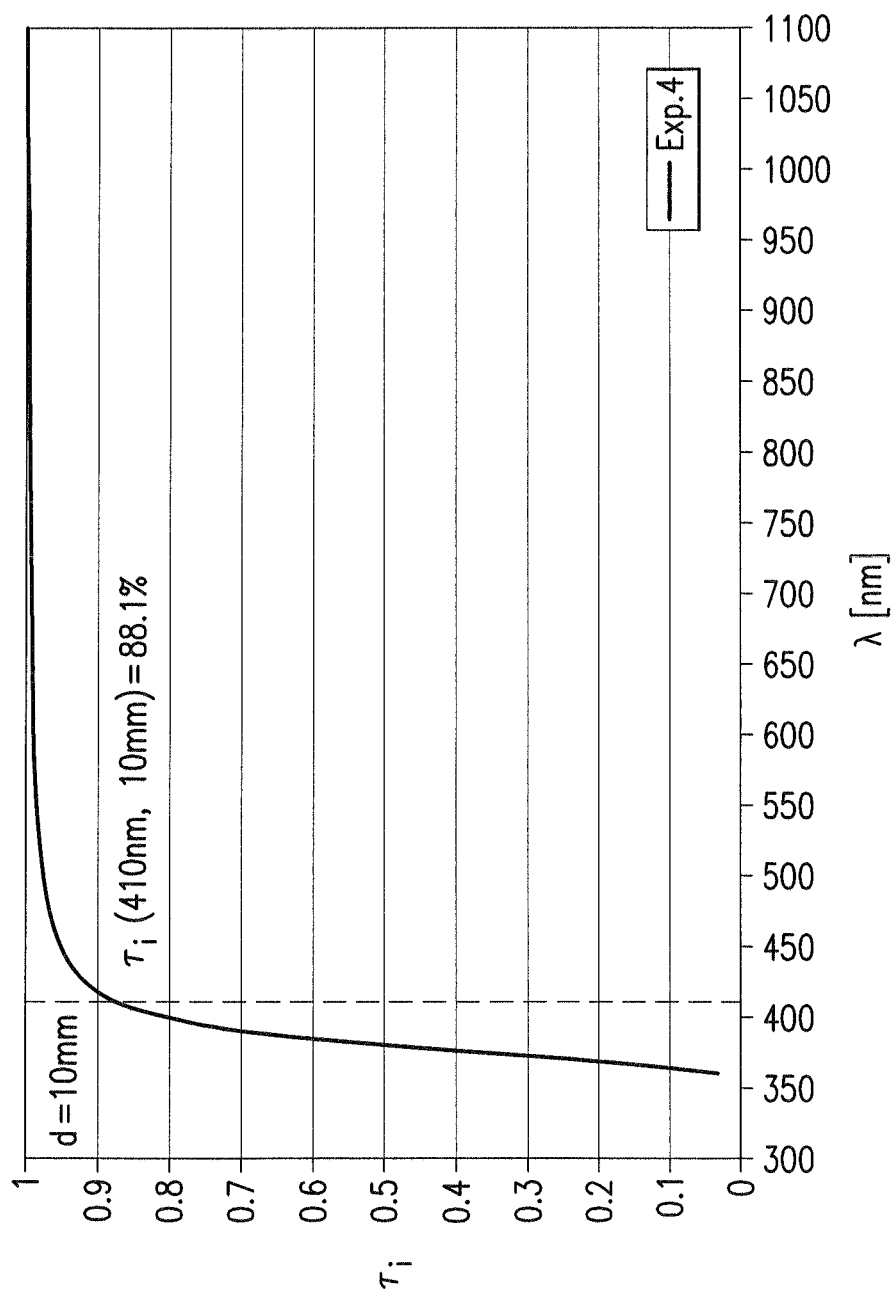
FIG. 1 is a graphical illustration showing the internal transmittance spectrum of the glass of example 4 according to the present invention.
Figure 2:
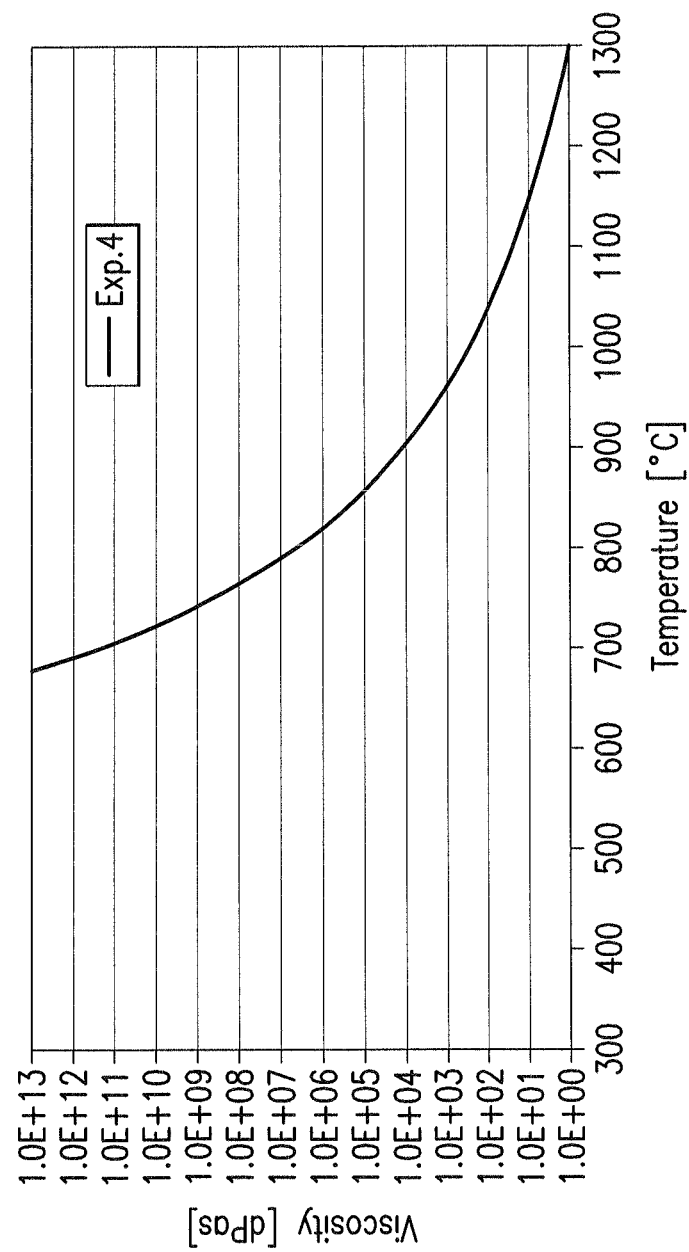
FIG. 2 is graphical illustration of the temperature dependence of the viscosity of the glass of example 4 according to the present invention, which allows temperatures of less than 1350° C. to be used for hot pressing, which proves advantageous for the quality of the glass, e.g. with respect to streaks and transmittance.

In the following disclosure the present invention is explained in more detail by presenting a series of examples. But the present invention is not limited to the disclosed examples.

EXAMPLE

The raw materials for the oxides are weighed out, one or more fining agents are added and the mixture is subsequently mixed well. The glass batch or mixture is melted in a discontinuous or continuous high frequency melt aggregate in a skull crucible and fined (1400° C.). At a cast temperature of lower than or equal to 1350° C. the glass can be cast and processed into the desired dimensions.

TABLE I

Melting Example for 100 kg of Calculated Glass (According to Example 1)

| Oxide | % of cations | Raw material | Weighed portion (g) |
|---|---|---|---|
| $B^{3+}$ | 41.12 | $H_3BO_3$ | 20934.09 |
| $La^{3+}$ | 29.95 | $La_2O_3$ | 40152.68 |
| $Y^{3+}$ | 2.0 | $Y_2O_3$ | 1860.10 |
| $Zr^{4+}$ | 3.21 | $ZrO_2$ | 3263.16 |
| $Ta^{5+}$ | 10.83 | $Ta_2O_5$ | 19721.33 |
| $Gd^{3+}$ | 3.05 | $Gd_2O_3$ | 4530.30 |
| $W^{6+}$ | 9.75 | $WO_3$ | 18665.39 |
| $Sb^{3+}$ | 0.08 | $Sb_2O_3$ | 90.46 |
| Sum | 100.0 | | 109217.51 |

Table II contains examples 1 to 4 of glasses according to the present invention.

TABLE II

Examples 1 to 4 of the Glass according to the Invention

| oxides containing | Ex. 1 % of cations | Ex. 2 % of cations | Ex. 3 % of cations | Ex. 4 % of cations |
|---|---|---|---|---|
| $B^{3+}$ | 41.12 | 41.12 | 41.37 | 38.06 |
| $La^{3+}$ | 29.95 | 29.96 | 30.16 | 30.76 |
| $Y^{3+}$ | 2.0 | 0.86 | 0.86 | 0.89 |
| $Nb^{5+}$ | | 1.14 | 0.55 | 0.59 |
| $Zr^{4+}$ | 3.21 | 3.78 | 3.80 | 3.88 |
| $Ta^{5+}$ | 10.83 | 10.86 | 10.85 | 11.13 |
| $Gd^{3+}$ | 3.05 | 3.03 | 3.05 | 3.12 |
| $W^{6+}$ | 9.75 | 9.19 | 9.27 | 9.43 |
| $Si^{4+}$ | | | | 2.06 |
| $Sb^{3+}$ | 0.08 | 0.08 | 0.03 | 0.08 |
| Σ | 100 | 100 | 100 | 100 |
| Properties | | | | |
| $n_d$ (20 K/h) | 1.94848 | 1.95299 | 1.95042 | 1.95238 |
| $v_d$ (20 K/h) | 33.67 | 33.28 | 33.52 | 33.43 |
| $P_{g,F}$ | 0.5854 | 0.5858 | 0.5854 | 0.5857 |

TABLE II-continued

Examples 1 to 4 of the Glass according to the Invention

| oxides containing | Ex. 1 % of cations | Ex. 2 % of cations | Ex. 3 % of cations | Ex. 4 % of cations |
|---|---|---|---|---|
| $\Delta P_{g,F}$ | −0.0018 | −0.0020 | −0.0020 | −0.0019 |
| $\tau_i$ (10 mm, 400 nm) [%] | 78.9 | 78.2 | 79.1 | 79.3 |
| $\tau_i$ (10 mm, 410 nm) [%] | 85.8 | 85.4 | 85.9 | 86.1 |
| $\tau_i$ (10 mm, 420 nm) [%] | 90.0 | 89.8 | 90.0 | 90.1 |
| $\tau_i$ (10 mm, 520 nm) [%] | 98.2 | 98.2 | 98.4 | 98.6 |
| $\tau_i$ (10 mm, 650 nm) [%] | 99.0 | 99.1 | 99.1 | 99.4 |
| $\alpha_{20-300\,°C}$ [$10^{-6}$/K] | 8.06 | 7.92 | 7.98 | 7.98 |
| Tg [° C.] | 681 | 679 | 680 | 685 |
| $\rho$ [g/cm$^3$] | 5.97 | 5.94 | 5.95 | 5.97 |

Preferably the glasses according to the present invention are composed entirely of oxides and have a glass transition temperature Tg that is less than or equal to 700° C., can be processed well and have a good resistance to alkalis (good alkali resistance).

The coefficients of expansion are in a range that is much less than $9\times10^{-6}$ per K, measured in the temperature range of 20 to 300° C. The internal transmittance of the glass at 410 nm and at a thickness of 10 mm is greater than or equal to 80%.

While the invention has been illustrated and described as embodied in highly refractive and highly transparent optical glasses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A lead-free and arsenic-free optical glass having a refractive index $n_d$ of $1.945 \leq n_d \leq 1.97$, an Abbe number $v_d$ of $33 \leq v_d \leq 36$, and an internal transmittance of >80% at 410 nm and at a thickness of 10 mm, wherein said optical glass has a composition comprising respective components in the following amounts expressed in % of corresponding cations of said respective components in said composition, with reference to a sum of all cations in the composition:

| | |
|---|---|
| $B^{3+}$ | 35-46 |
| $La^{3+}$ | 25-35 |
| $Ta^{5+}$ | 6-14 |
| $W^{6+}$ | 6-13 |
| $Zr^{4+}$ | 1-7 |
| $Gd^{3+}$ | 0-5 |
| $Nb^{5+}$ | 0-4 |
| $Y^{3+}$ | 0-4 |
| $Ba^{2+}$ | 0-2 |
| $\Sigma$alkaline earth metal cations | 0-2 |
| $\Sigma La^{3+} + Ta^{5+} + W^{6+} + Zr^{4+} + Gd^{3+} + Nb^{5+} + Y^{3+}$ | $\geq 50$ |
| cations of at least one fining agent | 0-0.3, | wherein a ratio of $B^{3+}$ to $La^{3+}$ is 1.1 to 1.6, a ratio of $B^{3+}$ to $\Sigma Si^{4+}+B^{3+}$ is greater than 0.5, and the glass is free of $Ti^{4+}$, $Th^{4+}$, $Zn^{2+}$, $F^-$ and $Hf^{4+}$, and wherein the glass contains less than 6 ppm of platinum.

2. The glass according to claim 1, having a coefficient of expansion $\alpha_{(20,\,300°\,C.)}$ that is less than $9\times10^{-6}$/K.

3. The glass according to claim 1, wherein the respective components are contained in the following amounts expressed in % of the corresponding cations in said composition, with reference to the sum of the cations in the composition:

| | |
|---|---|
| $B^{3+}$ | 36-45 |
| $La^{3+}$ | 26-34 |
| $Ta^{5+}$ | 7-13 |
| $W^{6+}$ | 7-12 |
| $Zr^{4+}$ | 2-6 |
| $Gd^{3+}$ | 0-4 |
| $Nb^{5+}$ | 0.1-3 |
| $Y^{3+}$ | 0-3 |
| $Ba^{2+}$ | 0-1 |
| $\Sigma$alkaline earth metal cations | 0-2 |
| $\Sigma La^{3+} + Ta^{5+} + W^{6+} + Zr^{4+} + Gd^{3+} + Nb^{5+} + Y^{3+}$ | $\geq 52$ |
| cations of at least one fining agent | 0-0.2, | wherein a ratio of $B^{3+}$ to $La^{3+}$ is 1.2 to 1.5, a ratio of $B^{3+}$ to $\Sigma Si^{4+}+B^{3+}$ is greater than 0.7, and the glass is free of $Ti^{4+}$, $Th^{4+}$, $Zn^{2+}$, $F^-$ and $Hf^{4+}$, and wherein the glass contains less than 6 ppm of platinum.

4. The glass according to claim 1, wherein said at least one fining agent comprises at least one of the following components, each in an amount expressed in % of cations of the at least one component in the total number of cations in the composition of:

| | | |
|---|---|---|
| $Sb_2O_3$ | 0-0.3 | and/or |
| SnO | 0-0.3 | |

5. Optical element, comprising a glass according to claim 1.

6. A method of producing an optical glass according to claim 1, comprising the step of direct inductive heating of a mixture of raw materials with an electromagnetic alternating field.

7. A method of producing an optical element, said method comprising the step of pressing a glass according to claim 1.

8. A lead-free and arsenic-free optical glass having a refractive index $n_d$ of $1.945 \leq n_d \leq 1.97$, an Abbe number $v_d$ of $33 \leq v_d \leq 36$, and an internal transmittance of >80% at 410 nm and at a thickness of 10 mm, wherein said optical glass has a composition comprising respective components are contained in the following amounts expressed in % of the corresponding cations in said composition, with reference to the sum of the cations in the composition:

| | |
|---|---|
| $B^{3+}$ | 37-44 |
| $La^{3+}$ | 27-33 |
| $Ta^{5+}$ | 8-12 |
| $W^{6+}$ | 8-11 |
| $Zr^{4+}$ | 2-5 |
| $Gd^{3+}$ | 0.5-4 |
| $Nb^{5+}$ | 0.5-2 |
| $Y^{3+}$ | 0-2.5 |
| $Ba^{2+}$ | 0-1 |
| $\Sigma$ alkaline earth metal cations | 0-2 |
| $\Sigma La^{3+} + Ta^{5+} + W^{6+} + Zr^{4+} + Gd^{3+} + Nb^{5+} + Y^{3+}$ | $\geq 53$ |
| cations of at least one fining agent | 0-0.1, | wherein a ratio of $B^{3+}$ to $La^{3+}$ is 1.2 to 1.5, a ratio of $B^{3+}$ to $\Sigma Si^{4+}+B^{3+}$ is greater than 0.8, and the glass is free of $Ti^{4+}$, $Th^{4+}$, $Zn^{2+}$, $F^-$ and $Hf^{4+}$, and wherein the glass contains less than 6 ppm of platinum.

\* \* \* \* \*